US012699285B2

(12) United States Patent (10) Patent No.: US 12,699,285 B2

Norvell et al. (45) Date of Patent: Aug. 4, 2026

(54) EYEWEAR LENS ATTACHMENT SYSTEM

(71) Applicant: Oakley, Inc., Foothill Ranch, CA (US)

(72) Inventors: Bryan L. Norvell, Huntington Beach, CA (US); Benjamin S. Cohen, Tustin, CA (US)

(73) Assignee: Oakley, Inc., Foothill Ranch, CA (US)

( * ) Notice: Subject to any disclaimer, the term of this patent is extended or adjusted under 35 U.S.C. 154(b) by 229 days.

(21) Appl. No.: 18/515,858

(22) Filed: Nov. 21, 2023

(65) Prior Publication Data

US 2024/0168315 A1 May 23, 2024

Related U.S. Application Data

(60) Provisional application No. 63/427,000, filed on Nov. 21, 2022.

(51) Int. Cl.
 *G02C 9/00* (2006.01)
 *G02C 7/08* (2006.01)
(52) U.S. Cl.
 CPC .............. *G02C 9/00* (2013.01); *G02C 7/088* (2013.01); *G02C 2200/02* (2013.01)
(58) Field of Classification Search
 CPC ...... G02C 9/00; G02C 7/088; G02C 2200/02; G02C 2200/04; G02C 1/10; A61F 9/025
 See application file for complete search history.

(56) References Cited

U.S. PATENT DOCUMENTS

2022/0040002 A1* 2/2022 Møller .................... A61F 9/025

FOREIGN PATENT DOCUMENTS

| DE | 202013000104 U1 | 1/2013 |
| WO | WO 2020053338 A1 | 3/2020 |
| WO | WO 2021102602 A1 | 6/2021 |
| WO | WO 2021138400 A1 | 7/2021 |

OTHER PUBLICATIONS

European Search Report and Opinion directed to European Patent Application No. 23211207.8, dated Mar. 13, 2024; 10 pages.

* cited by examiner

*Primary Examiner* — Tuyen Tra
(74) *Attorney, Agent, or Firm* — Sterne, Kessler, Goldstein & Fox P.L.L.C.

(57) ABSTRACT

The present disclosure relates to a quick release system for removably attaching a lens to eyewear. The quick release system includes a magnetic component that magnetically secures the lens into the eyewear frame. One or more mechanical latches also releasably secures the lens into the eyewear frame. The latch is a single, moveable component that requires not additional parts to allow a user to attach and release the lens. The latch automatically ejects the lens from the eyewear frame when the latch is actuated to release the lens.

29 Claims, 14 Drawing Sheets

FIG. 4

EYEWEAR LENS ATTACHMENT SYSTEM

CROSS-REFERENCE TO RELATED APPLICATIONS

This application claims benefit of U.S. Application No. 63/427,000, filed on Nov. 21, 2022, which is incorporated herein by reference in its entirety.

FIELD

This disclosure relates to eyewear having a releasably attachable lens, and systems and methods for attaching the lens to the eyewear. Specifically, embodiments of this disclosure relates to a system for a secure, quick-release lens attachment system for a goggle.

BACKGROUND

Eyewear uses lenses to protect the eyes of a user while enabling the user to see through the lens. Lenses come in a variety of styles, such as one-piece/unitary or multi-piece lenses, and can be made with different coatings, tints, and light transmission rates to adapt to different lighting conditions. For example, a lens optimized for clear, sunny conditions will typically have a lower light transmission and darker tinting than a lens optimized for indoor, low-light conditions. Thus, it is desirable to be able to exchange lenses in a goggle to improve the flexibility of the eyewear and lens system. This is especially relevant for eyewear used in situations where maximum visibility is needed in potentially changing lighting conditions, such as all-day activities including snow sports like skiing and snowboarding, mountain biking, or motorcycle racing. The ability for a user to quickly change a lens in the field without any additional tools is balanced by the need to securely retain the lens in the eyewear. Thus, an eyewear lens attachment system should be able to securely retain a lens, while also providing for a quick, tool-free release of the lens. Existing systems are either difficult to use, require complex components, are not able to securely retain the lens, or various combinations of these issues. Thus, there exists a need for improved eyewear lens attachment systems.

BRIEF SUMMARY

An embodiment of the present disclosure is an eyewear that includes a lens assembly having a lens body; a lens frame coupled to an inner surface of the lens body; a lens magnet disposed on the lens frame; and a lens protrusion disposed on the lens frame. The eyewear also includes a frame having a frame magnet disposed on the frame in a position corresponding to a position of the lens magnet on the lens frame and configured to magnetically attract the lens magnet; a latch opening; a latch slidably disposed in the latch opening configured to releasably receive the lens protrusion in an opening in the latch; and a first detent groove and a second detent groove disposed in the latch opening and configured to receive a portion of the latch to secure the latch in a first position and a second position, respectively.

Another embodiment of the present disclosure is an eyewear having a lens assembly that includes a lens body; a lens frame coupled to an inner surface of the lens body; a lens magnet disposed on the lens frame; and a lens protrusion disposed on the lens frame having a lens ejection surface. The eyewear also includes a frame having a frame magnet disposed on the frame in a position corresponding to a position of the lens magnet on the lens frame and configured to magnetically attract the lens magnet; a latch opening disposed in the frame; and a latch slidably disposed in the latch opening configured to releasably receive the lens protrusion in an opening in the latch, the opening in the latch comprising a latch actuation surface that is configured to engage with the lens actuation surface of the lens protrusion, the latch actuation surface and the lens actuation surface configured to apply an ejecting force on the lens when the latch assembly is moved towards the lens.

BRIEF DESCRIPTION OF THE DRAWINGS

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION

Reference will now be made in detail to representative embodiments illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiment whether or not explicitly described.

An embodiment of the present disclosure is an eyewear with a lens assembly and a frame assembly. The lens assembly includes a lens body with a lens frame that is coupled to the lens body. At least one lens magnet is attached to the lens frame and the lens frame also includes a lens protrusion. The eyewear frame includes a frame magnet that is positioned to magnetically attract the lens magnet. A latch is slidably disposed in an opening in the eyewear frame and is configured to releasably receive the lens protrusion in an opening in the latch assembly. The eyewear frame also has first and second detents in the opening in the frame that are configured to receive arms of the latch when the latch is in a first and second position, respectively.

This and other embodiments disclosed here have several benefits. For example, the disclosed eyewear embodiments are able to securely retain a lens using a combination of magnet-based retention and mechanical latching. The latch system comprises a single component that is easy to use and relatively simple to manufacture. The use of a single component also reduces assembly complexity and minimizes components that can potentially wear out. Lens replacement can be done quickly and without tools through the latch assembly, which improves the user's experience in the field. As will be explained in detail below, the latch system also facilitates removal of the lens by ejecting the lens from the frame when the latch is actuated. The latch also is designed to retain the lens in the eyewear frame even when external forces act to remove the lens. While the embodiments discussed here are directed at eyewear in the form of goggles (e.g., eyewear having a strap that wraps around the wearer's head), this disclosure encompasses lens-to-frame connection of any eyewear, such as a lens mounted to an eyeglasses frame (e.g., eyewear having temples (or earstems) supported by the wearer's ears).

Figure 1:
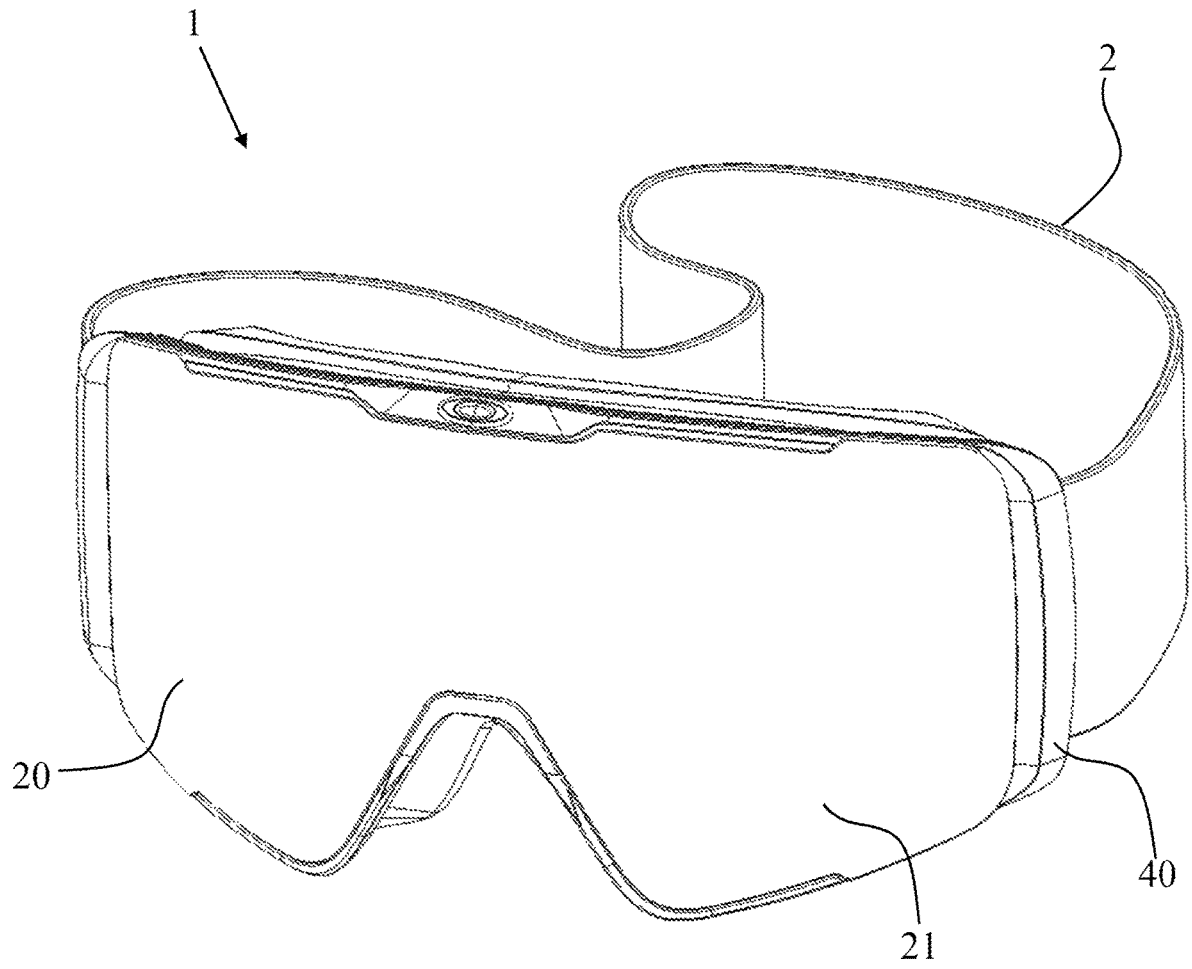
FIG. 1 is a perspective view of a goggle according to an embodiment.
Figure 2:
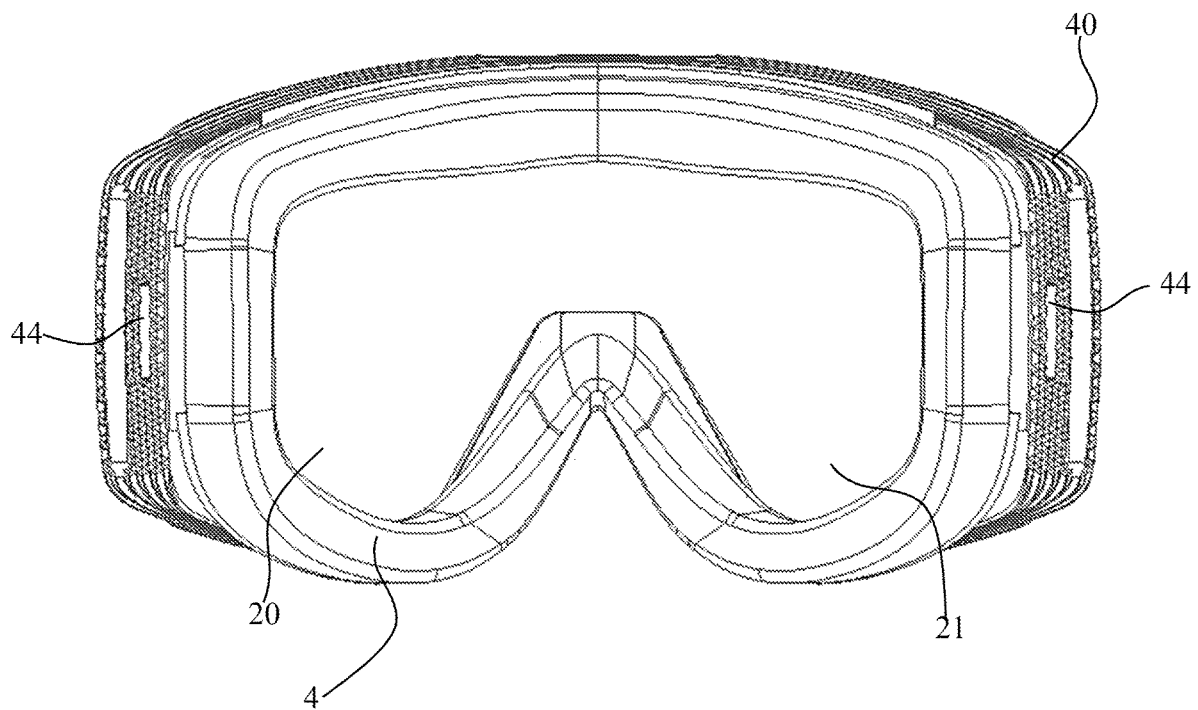
FIG. 2 is a rear view of the goggle of FIG. 1 in an alternate configuration.

As seen in FIGS. 1-2, a goggle 1 includes a lens assembly 20 with a lens body 21 that is releasably mounted in a goggle frame 40. A flexible strap 2 is attached to both lateral ends of goggle frame 40 to form a continuous loop from goggle frame 40 and strap 2. Strap 2 can be releasably or permanently attached to goggle frame 40 through any suitable attachment technique, such as buckles, stitched loops, or fabric welding. Strap 2 can also having suitable adjustment mechanisms to enable the length of strap 2 to be adjusted to a given user's preferences. Strap 2 can be made from any suitable flexible material. In some embodiments, strap 2 is made from a soft, elastic material that can stretch to improve user comfort.

As seen in FIG. 2, goggle 1 also includes a cushion 4 attached to an interior of goggle frame 40. In some embodiments, cushion 4 can be removably attached to goggle frame 40 to allow replacement cushions 4 to be substituted into goggle 1. Suitable techniques for removable attachment of cushion 4 include hook and loop fasteners or mechanical attachment (e.g., a dovetail system between goggle frame 40 and cushion 4). In other embodiments, cushion 4 is attached to goggle frame 40 through, for example, suitable adhesives. Cushion 4 lines the inner perimeter of goggle frame 40 and is contoured to match the face shape of the user. Cushion 4 can be made from a soft, flexible material that improves user comfort by cushioning the face of the user. Also seen in FIG. 2 are latch openings 44 that will be discussed below.

Figure 3:
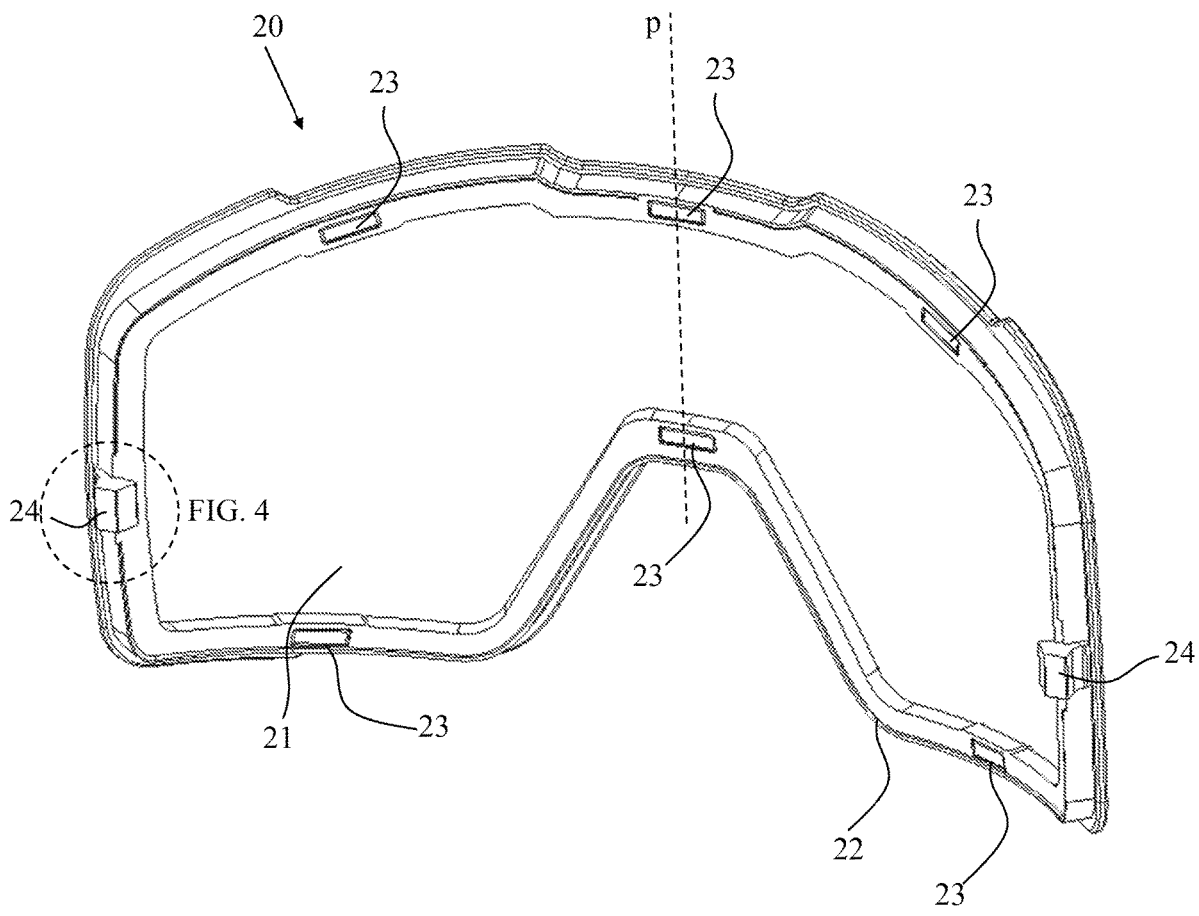
FIG. 3 is a rear perspective view of a goggle lens according to an embodiment.

As shown in FIG. 3, lens assembly 20 includes two main components: lens body 21 and a lens frame 22. Lens body 21 is the optical portion of lens assembly 20, and is configured to allow a user to see through lens assembly 20. As discussed in the background section, lens body 21 can be formed with any suitable transparency, coatings, and tints. For example, a clear lens body 21 may be suitable for low light conditions, while a dark tinted lens body 21 is suitable for sunny conditions. Coatings can include anti-fog, antiscratch, and light filtering coatings. Lens body 21 can be formed from any suitable material, including plastics and glass materials.

Lens frame 22 is coupled to lens body 21. In some embodiments, this coupling is permanent, either through plastic welding or adhesive bonding. In other embodiments, lens frame 22 is a formed as a single, unitary part of lens body 21, and thus these elements are one monolithic structural unit. As shown in FIG. 3, lens frame 22 can be coupled to the interior perimeter of lens body 21. In some embodiments, it is desirable to position lens frame 22 at the perimeter of lens body 21 to minimize the field of view blocked by lens frame 22. Lens frame 22 can be formed from any suitable material, including plastics, and can also be formed from the same material as lens body 21.

Also visible in FIG. 3 are a plurality of lens magnets 23. Each lens magnet 23 is fixed on or in lens frame 22 by a suitable method, such as adhesives or mechanical fastening (e.g., a snap fit). As will be explained in detail below, lens magnet 23 can be made from a suitable magnetic material such that it can magnetically attract other magnetic materials. One or more lens magnets 23 can be present in lens frame 22. For example, as shown in FIG. 3, there may be six lens magnets 23. Three lens magnets 23 can be equally spaced across the brow region of lens frame 22. Two lens magnets 23 can be placed in the lower cheek regions of lens frame 22. And the final lens magnet 23 can be placed at the bridge of the nose are of lens frame 22. Any other number and arrangement of lens magnets 23 is possible, including two, three, four five, seven, eight, nine, or ten lens magnets 23, distributed equally or unequally around lens frame 22. For example, lens magnets 23 could be present on the lateral sides of lens frame 22. In some embodiments, single lens magnets 23 can extend across significant portions of frame 40. For example, in some embodiments, a single lens magnet 23 can extend across the entire brow region of frame 40 or across the entire nose bridge and/or each lower cheek region. In other embodiments, a single, continuous lens magnet 23 can run the entire perimeter of frame 40. Considerations affecting the number and distribution of lens magnets 23 are discussed further below.

Lens frame 22 also includes one or more lens protrusions 24. For example, as seen in FIG. 3, there can be two lens protrusions 24, such as one positioned at each lateral end of lens frame 22. As will be discussed further below, each lens protrusion 24 corresponds with, and is received by, a latch 50 (as seen in FIGS. 6-10) in goggle frame 40 to mechanically fasten lens assembly 20 to goggle frame 40. There can be any number of lens protrusions 24 depending on the number of latches 50 that are present. The positioning and number of lens protrusion 24 will be discussed in detail with respect to the discussion regarding the latching system below.

Figure 4A:
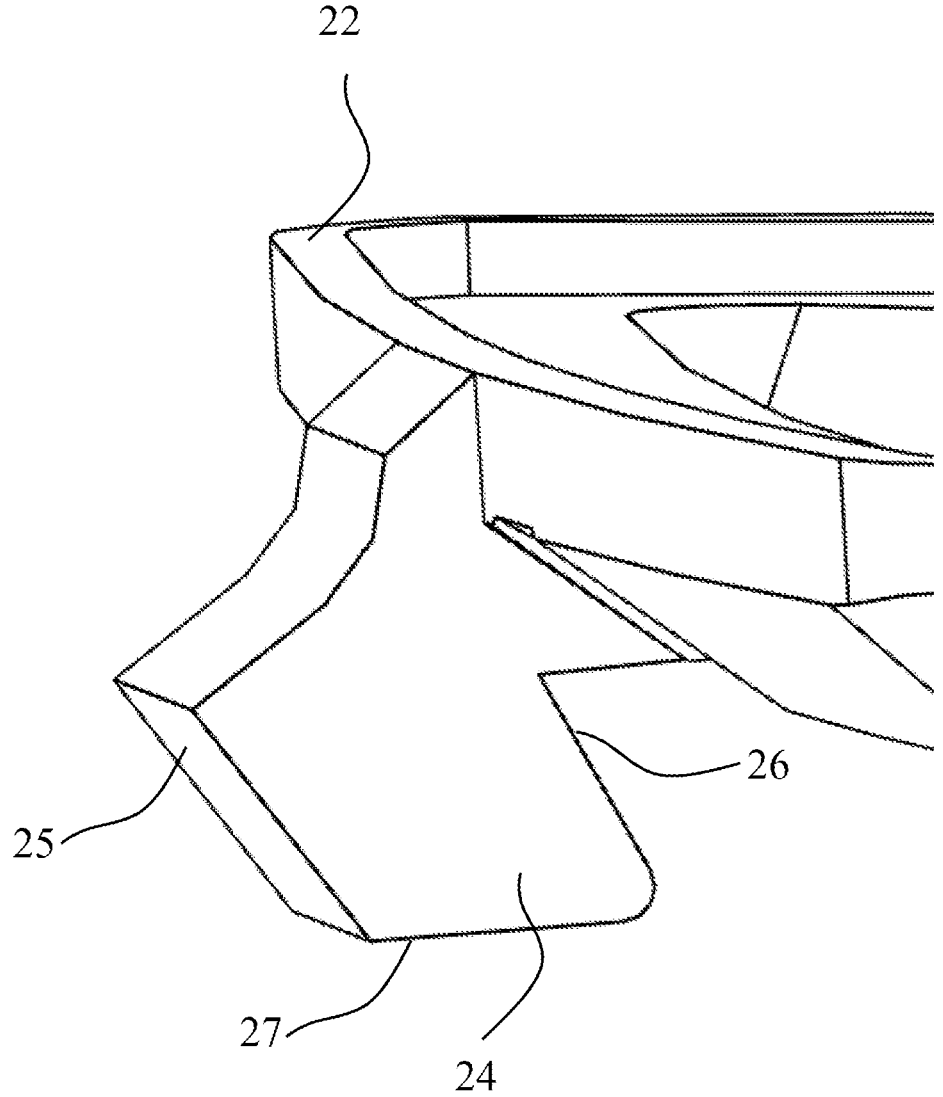
FIG. 4A is a detail perspective view of a portion of a lens frame according to an embodiment.
Figure 4B:
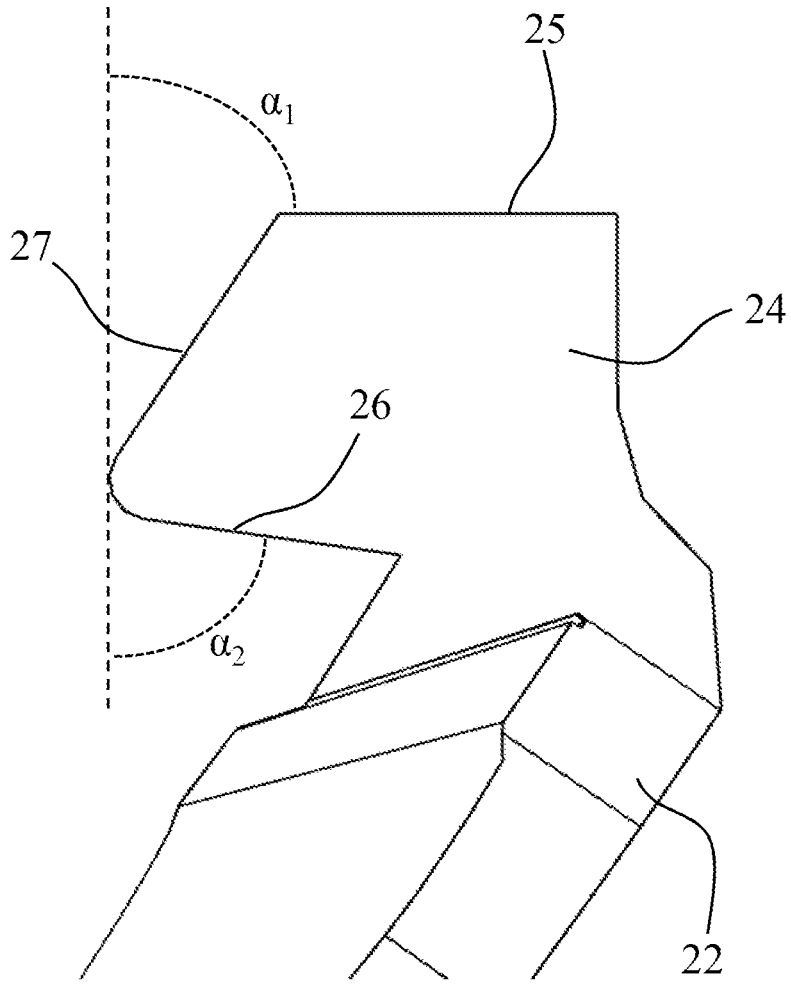
FIG. 4B is a detail top view of the portion of a lens frame from FIG. 4A.

As seen in FIGS. 4A-4B, in an embodiment, lens protrusions 24 are shaped as an extrusion of lens frame 22 that extends rearwards from lens frame 22 (i.e., lens protrusion 24 extends towards the face of the user when lens assembly 20 is mounted in goggle 1). As shown in FIG. 4, lens protrusions 24 can be formed as an integral, unitary part of lens frame 22. In other embodiments, lens protrusion 24 can be formed as a separate structure and can be permanently fixed to lens frame 22 by any suitable means, such as plastic welding or adhesives. Lens protrusion 24 has a bottom surface 27 and can include two planar surfaces that interface with latch 50: a lens actuation surface 25, and a lens retention surface 26. These surfaces are substantially flat or planar, as can be seen in FIGS. 4A-4B. They are inclined at a specific angles $\alpha_1$ (for lens retention surface 26) and $\alpha_2$ (for lens actuation surface 25) with respect to the vertical plane containing a line p passing through the top of the nose region and center of the brow region (see FIG. 3). This plane is oriented along the wearer's straight-ahead line of sight with the plane extending directly forward and rearwards from lens body 21 and thus bisects the lens. Angles $\alpha_1$ and $\alpha_2$ are designed to interact with portions of latch 50 to achieve the ejection and retention functionality of goggle 1, as will be explained below. For example, angle $\alpha_1$ can range between 85° and 115°. In the embodiment of FIG. 4, $\alpha_1$ is approximately 95°. Likewise, for example, angle $\alpha_2$ can range between 70° and 100°. In the embodiment of FIG. 4, $\alpha_2$ is approximately 85°.

Figure 5:
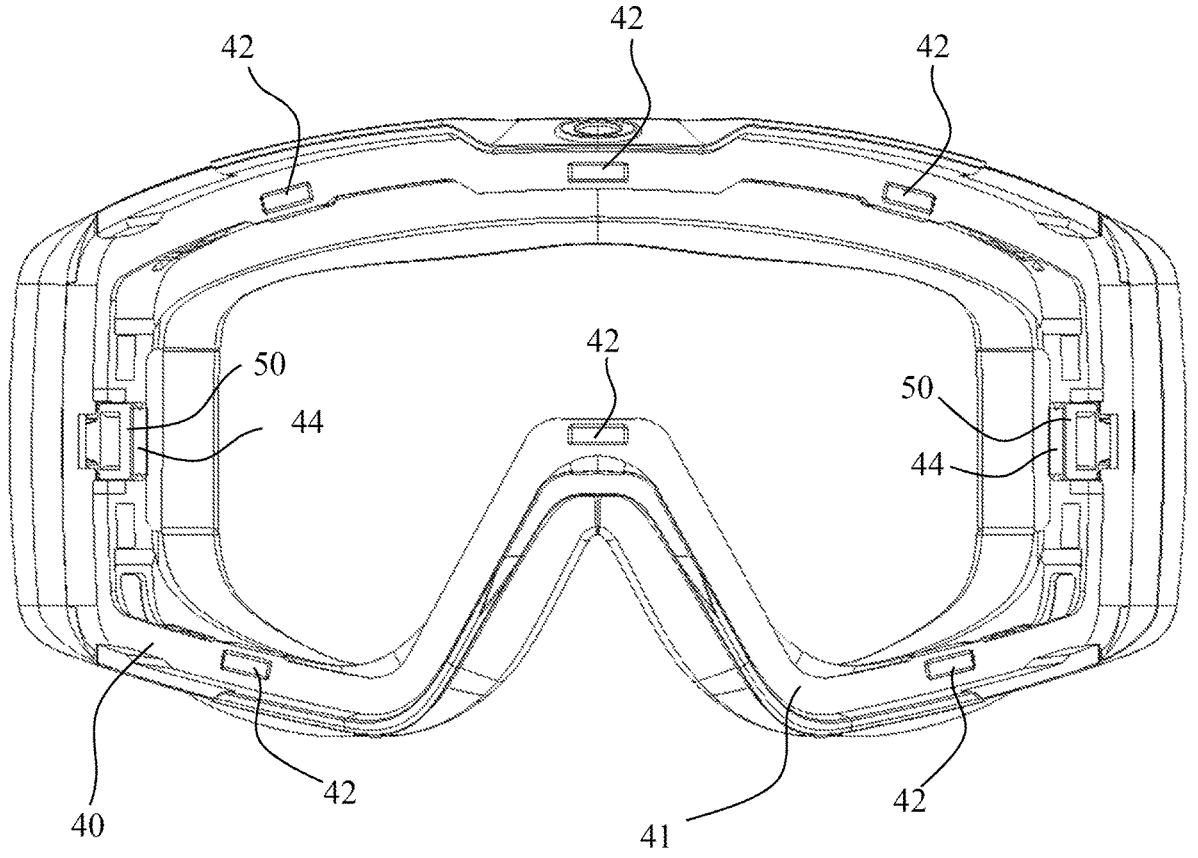
FIG. 5 is a front view of a goggle frame according to an embodiment.

Goggle frame 40 is the element that receives lens assembly 20 and provides the elements necessary for goggle 1 to be worn by the user (e.g., strap 2 and cushion 4). As shown in FIGS. 1 and 5, goggle frame 40 is shaped to receive lens assembly 20 in a lens opening 41. Lens opening 41 can be shaped to prevent movement of lens assembly 20 in one or more directions, for example, by being formed with a recessed shelf that matches the perimeter of lens assembly 20. Lens opening 41 can also have sealing elements, such as a seal, that interfaces with lens assembly 20 to reduce unwanted transmission of external environmental conditions (e.g., rain, debris in the air) around lens assembly 20. In an aspect, the seal can be elastomeric.

At least one frame magnet 42 is disposed in or on goggle frame 40 around the perimeter of lens opening 41. Each frame magnet 42 is fixed to frame 40, for example, by adhesives or mechanical mounting (e.g., a snap fit). Each frame magnet 42 is also positioned to correspond to the location of one of lens magnets 23. Frame magnet 42 is constructed from magnetic material, and therefore attracts the corresponding lens magnet 23 when lens assembly 20 is brought sufficiently close to lens opening 41. This magnetic force acts to bring lens body 21 to goggle frame 40 and is one of the two retention methods used in goggle 1. Using magnetic force to mount lens assembly 20 to goggle frame 40 has several advantages. For example, magnetic retention provides a consistent securing force that keeps lens assembly 20 in place, and also is a retention method that is not subject to wear or environmental degradation. The securing force can also be tailored to be removable by adjusting the number of lens magnet 23/frame magnet 42 pairings, as well as the strength of the attraction between each of these pairings, which can be tailored by adjusting the type and size of the magnetic material used. However, it is desirable to further secure lens assembly 20 to goggle frame 40 and not rely solely on the magnetic attraction, which could provide insufficient securing force in a sporting environment (leading to unintended detachment of the removable lens assembly 20). Specifically, because removability favors a magnetic retention force that is not too strong, magnetic retention alone can be inadequate to secure lens assembly 20 in goggle frame 40. A more secure second retention method in the form of one or more latches 50 as discussed below.

FIG. 5 shows six frame magnets 42 in positions corresponding to the six lens magnets 23 discussed above with respect to FIG. 3. However, there may be more or less frame magnets 42 (and, correspondingly, more or less lens magnets 23). It is desirable to space frame magnets 42 evenly about goggle frame 40, because this ensures that the magnetic force securing lens assembly 20 to goggle frame 40 is distributed evenly about lens body 21. This improves the seating and security of lens assembly 20 in goggle frame 40. Thus, the six frame magnets 42 in FIG. 5 are spaced evenly about the perimeter of lens opening 41. As discussed above, the number and size of frame magnets 42 (and lens magnets 23) can be used to tailor the total magnetic retention force.

Figure 6:
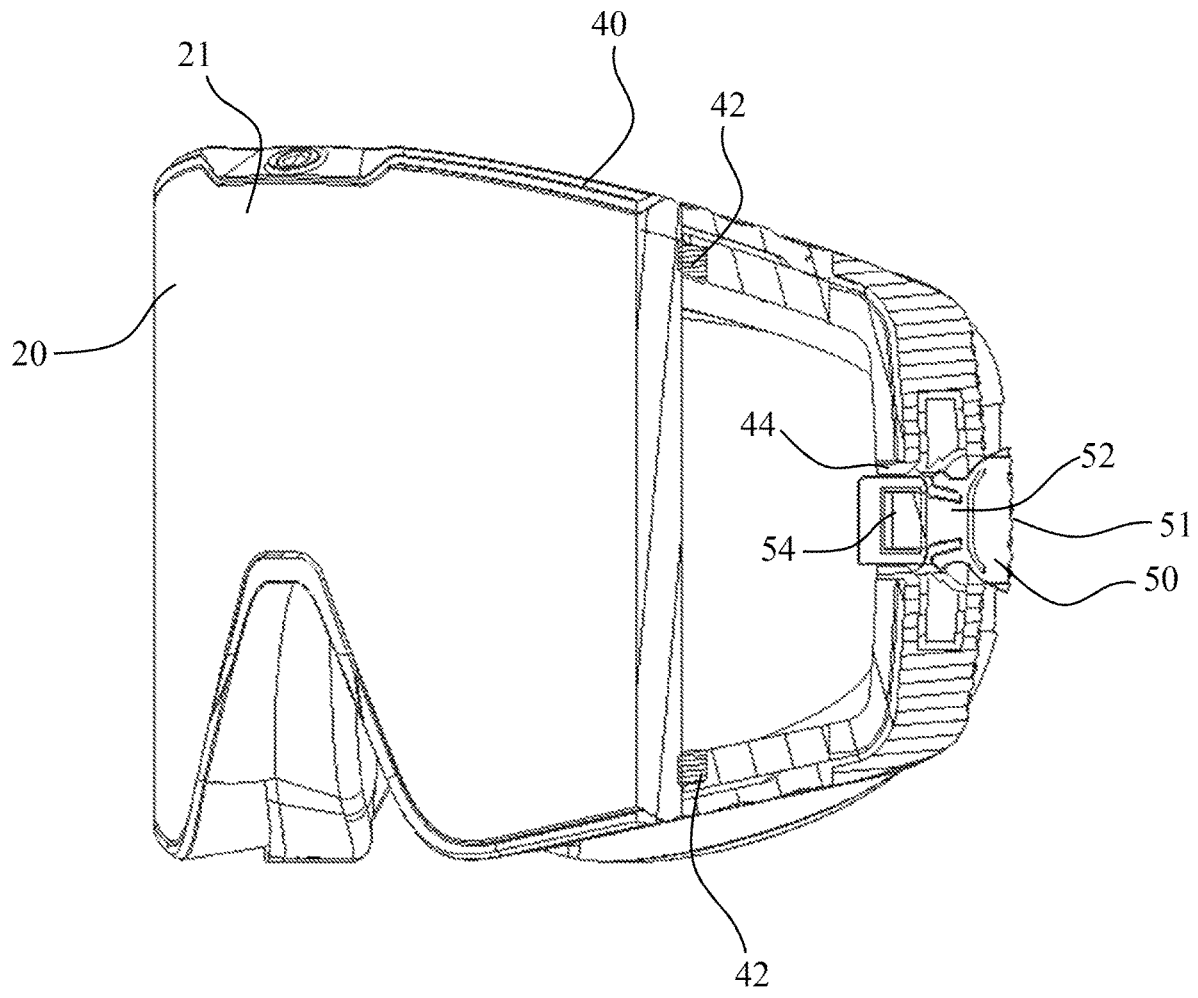
FIG. 6 is a partial section view of a goggle frame according to an embodiment.

FIG. 6 shows a partial cut-away view of a lateral end of goggle frame 40 and lens assembly 20. In this view, latch 50 is visible in a latch opening 44 that is formed in goggle frame 40. Latch opening 44 is formed to slidably accommodate latch 50. As can be seen in FIG. 6, latch 50 extends beyond the exterior of goggle frame 40. This allows a user to apply a force to an exterior portion 51 of latch 50, for example with their finger, to actuate latch 50. In some embodiments, exterior portion 51 may be textured to improve the tactile feel of pushing on latch 50.

Figure 7:
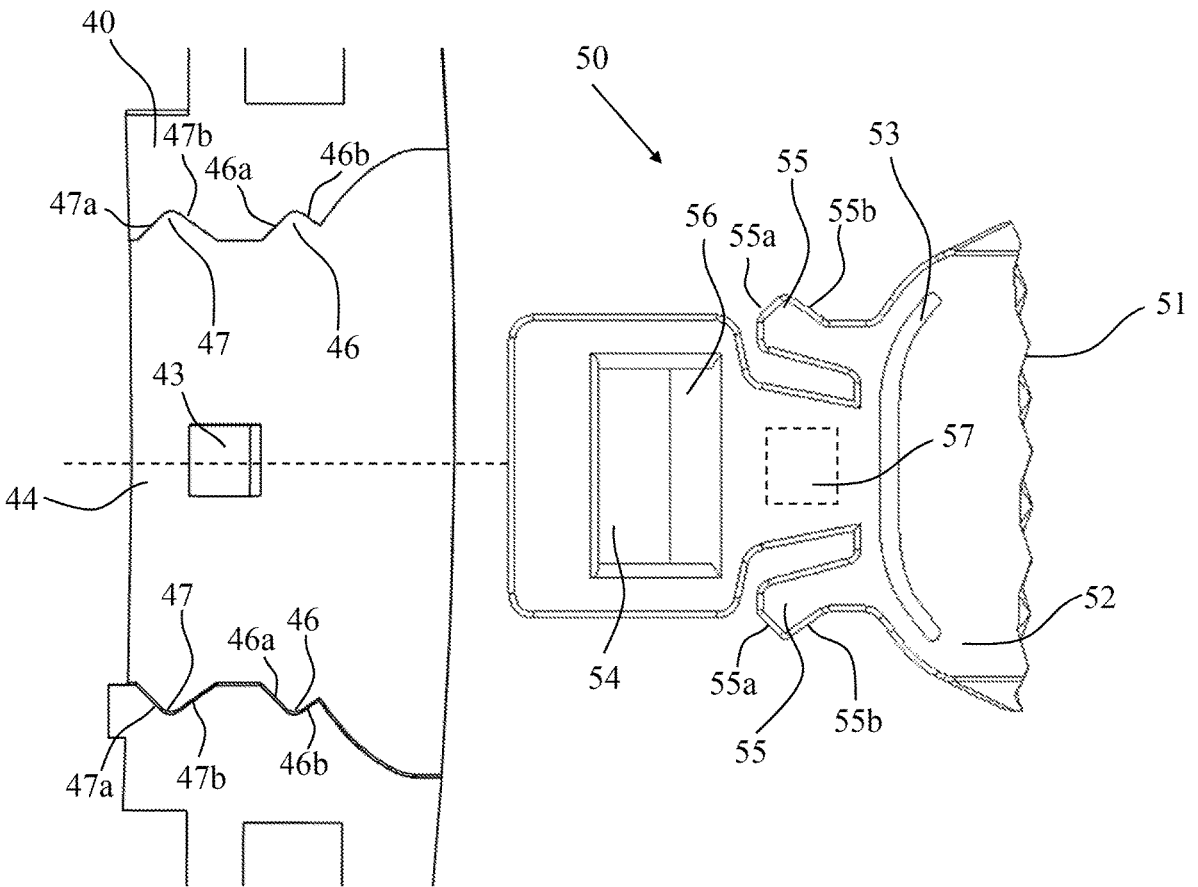
FIG. 7 is an exploded view of a portion of a goggle frame and a goggle latch assembly according to an embodiment.

FIG. 7 is an exploded view of the portion of goggle frame 40 that defines latch opening 44 and latch 50 adjacent to and aligned with latch opening 44. Visible in FIG. 7 are first detent groove 46 and second detent groove 47 formed in the walls of latch opening 44. First detent groove 46 is formed from a first surface 46a and a second surface 46b that are essentially planar surfaces that meet at an angle. In some embodiments, these surfaces intersect at approximately 90°+/−15°. Likewise, second detent groove 47 is formed from a first surface 47a and a second surface 47b that are essentially planar surfaces that meet at an angle. In some embodiments, these surfaces intersect at approximately 90°+/−15° As will be discussed below, first detent groove 46 and second detent groove 47 are configured to receive arms 55 of latch 50 to secure latch 50 in first and second positions in latch opening 44 (corresponding to first detent groove 46 and second detent groove 47). First surfaces 46a/47a and second surfaces 46b/47b are set to match corresponding portions of arms 55, as will be discussed below. Latch opening 44 is sized to such that latch 50 slides smoothly without any excess movement that would lead to rattling or other undesirable noise.

Figure 8:
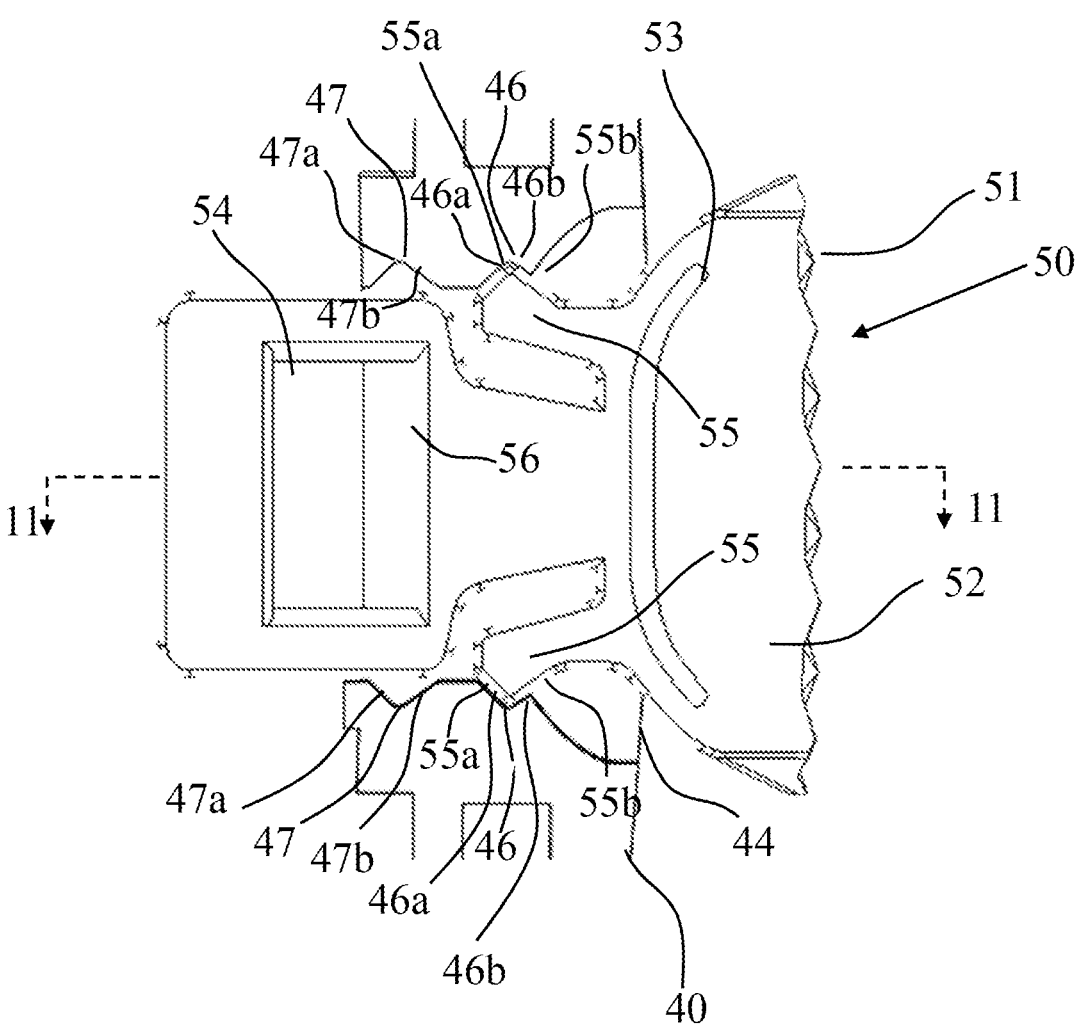
FIG. 8 is a top view of a portion of a goggle frame and a goggle latch assembly according to an embodiment.
Figure 9:
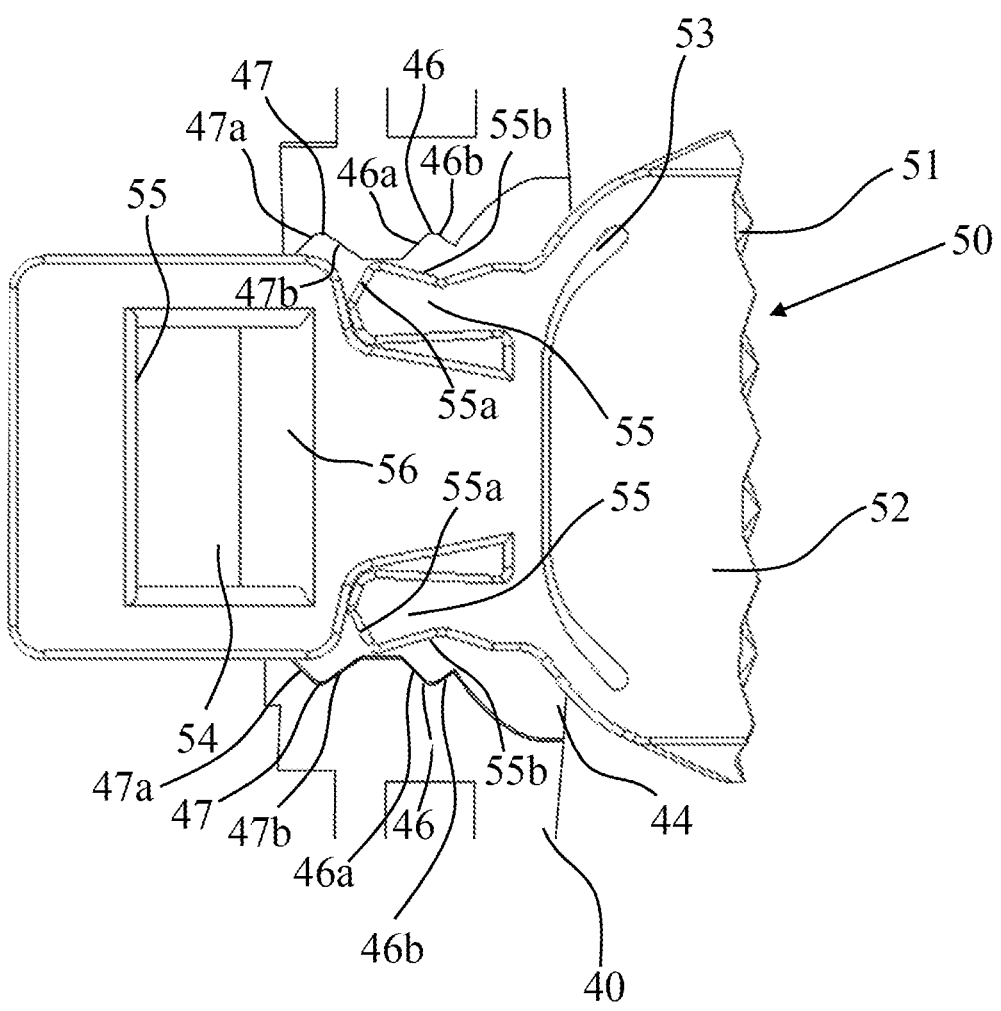
FIG. 9 is the view of FIG. 8 in an alternate configuration.

As seen in FIGS. 7-9, latch 50 is formed as a unitary latch body 52. In an aspect, top and bottom surfaces of latch body 52 can be flat. Latch body 52 can be made from any suitable material, such as plastics or metals. Preferably, latch body 52 is made from a material that can deform elastically.

Figure 10:
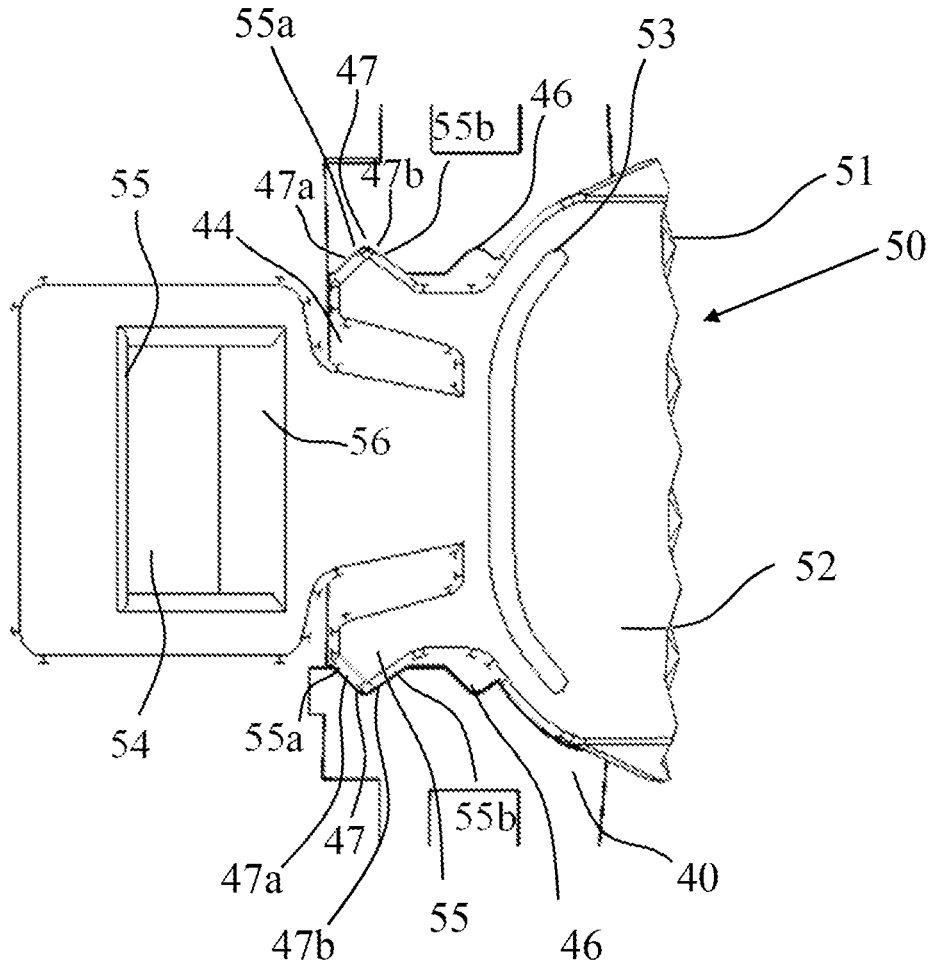
FIG. 10 is the view of FIG. 8 in an alternate configuration.

Latch arms can 55 extend from either side of latch body 52. In an embodiment, latch body 52 can include a single latch arm 55. In other embodiments, as shown in FIGS. 7-9, two latch arms can extend from latch body 52, one from either side. Latch arms 55 extend outwards at an angle from latch body 52, such that they also extend away from the exterior end of latch body 52. The distal ends of latch arms 55 are formed from a first surface 55a and second surface 55b, and are shaped to correspond to the shape of first and second detent grooves 46 and 47. Specifically, as seen in FIGS. 8 and 10, first surface 55a and second surface 55b meet at an acute angle to form a triangular shape as viewed in the Figures. First surfaces 46a/47a and second surfaces 46b/47b of first detent groove 46 and second detent groove 47 meet at a corresponding angle and are thus shaped to be in contact with first surface 55a and second surface 55b to securely receive the distal ends of latch arms 55.

Latch body 52 also has an opening 53 formed in a portion of latch body 52 near exterior portion 51 of latch body 52. Opening 53 is formed to allow a force to be applied on exterior portion 51 of latch body 52 to flex the exterior end inwards toward the center of latch body 52. This inward flexion is shown in FIG. 9, where opening 53 has collapsed because a force has been applied to the exterior end of latch body 52 (e.g., a user has pushed on latch body 52). This movement of exterior portion 51 towards latch body 52 causes arms 55 to flex inwards towards the center of latch body 52. This movement is a result of the way opening 53 causes the remainder of latch body 52 to flex as exterior portion 51 moves towards latch body 52. In an embodiment, opening 53 can be shaped as an arc or crescent cut-out. Other shapes are possible, such as rectangular, oval, or circular shapes.

FIGS. 8, 9, and 10 show latch 50 in three different operational positions. FIG. 8 shows latch 50 in the outer, first position where latch arms 55 are received by first detent groove 46. This position corresponds to the lens being fully attached and secured in lens opening 41. Lens protrusion 24 (not shown) is fully received by latch body opening 54. As can be seen, the configuration of first surfaces 55a and first surfaces 46a means that arms 55 will resist being moved inwards (towards second detent groove 47) if an inwards (leftwards in FIG. 8) force is applied to latch 50. This is the case because arms 55 press outwards in first detent groove 46 and prevent movement of latch 50.

FIG. 9 shows an intermediate position as latch 50 transitions from the first position to the second position. Latch 50 has been moved inwards by the application of an inwards force (e.g., the user pushing on exterior surface 51). Arms 55 have been moved inwards and have disengaged with first detent groove 46 as a result of the force on exterior portion 51 collapsing opening 53. This position also corresponds to the beginning of the lens ejection process, as lens protrusion 24 (not shown) is pushed out of latch opening 54 as will be discussed below.

FIG. 10 shows the inner, second position of latch 50, with arms 55 received in second detent groove 47. This positions corresponds to the lens being fully ejected (i.e., lens protrusion 24 is no longer in latch body opening 54). The lens attachment process is the opposite of the release process, with the motive force that pushes latch 50 from the second position in FIG. 10 to the first position in FIG. 8 being provided by the interaction between lens protrusion 24 and latch body opening 54, as will be discussed below.

FIG. 7 also shows a latch retainer 43 disposed in latch opening 44. This latch retainer can be formed as a small protrusion that extends into latch opening 44 (extending out of the page towards the reader in FIG. 7). It is received by a retainer opening 57 formed in the bottom of latch body 52. Latch 50 is free to slide in and out of the positions discussed above, but if latch body is moved too far outwards or inwards, latch retainer 43 interferes with the walls of retainer opening 57 and prevents latch 50 from moving beyond predefined limits.

Figure 11:
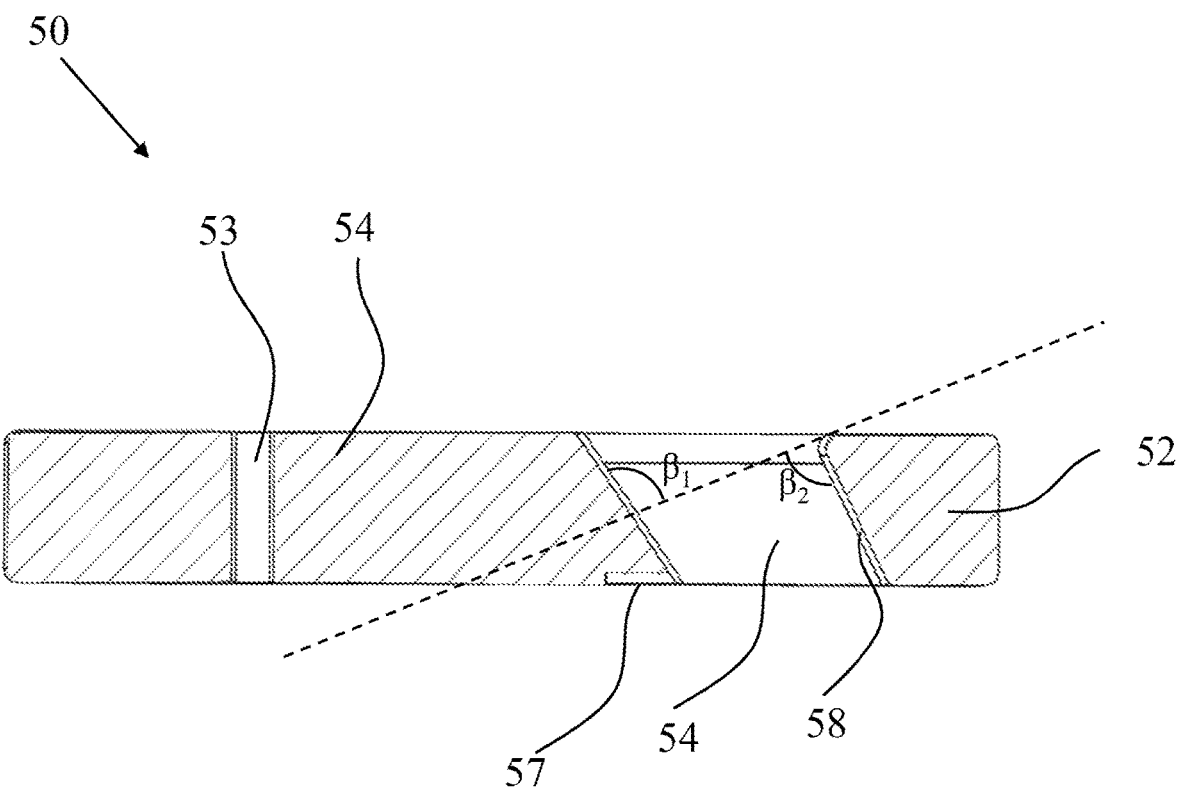
FIG. 11 is a cross section of a goggle latch.

Also seen in FIGS. 7-10 is a latch body opening 54 formed in latch body 52 near the end of latch body 52 opposite exterior portion 51. Latch body opening 54 is configured to releasably receive lens protrusion 24. As seen in the cross section of FIG. 11 taken along line 11-11 in FIG. 8, latch body opening 54 has two inclined planar surfaces: a latch body actuation surface 56, and a latch body retention surface 58. These surfaces are substantially flat, and are inclined at angles $\beta_1$ and $\beta_2$, respectively, such that they correspond to the angles of inclination $\alpha_1$ and $\alpha_2$ of the corresponding surfaces on lens protrusion 24. Specifically, lens actuation surface 25 corresponds with latch body actuation surface 56, and lens retention surface 26 corresponds with latch body retention surface 58. For example, angle $\beta_1$ can range between 85° and 115°. In the embodiment of FIG. 1, $\beta_1$ is approximately 95°. Likewise, for example, angle $\beta_2$ can range between 70° and 100°. In the embodiment of FIG. 11, $\beta_2$ is approximately 85°. Also shown in FIG. 11 is retainer opening 57 in the bottom of latch body 52.

Figure 12:
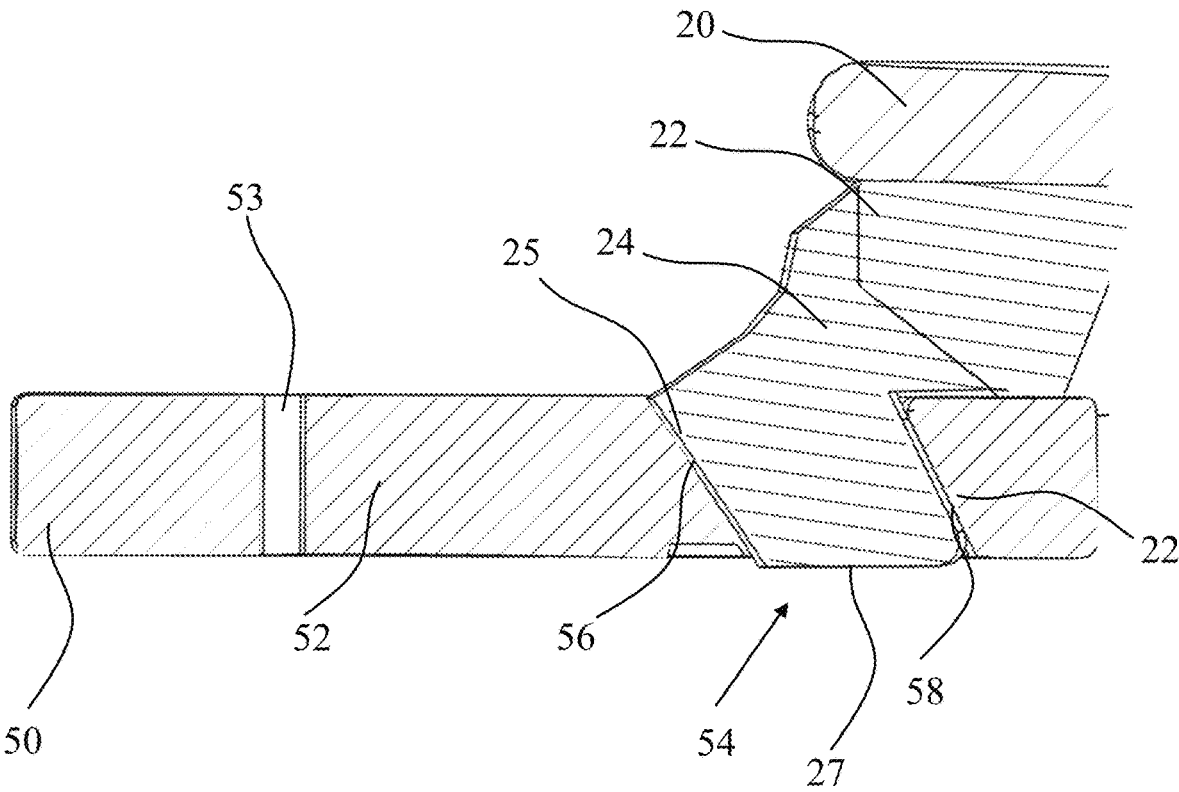
FIG. 12 is a cross section view of a portion of a lens interacting with a latch assembly according to an embodiment.
Figure 13:
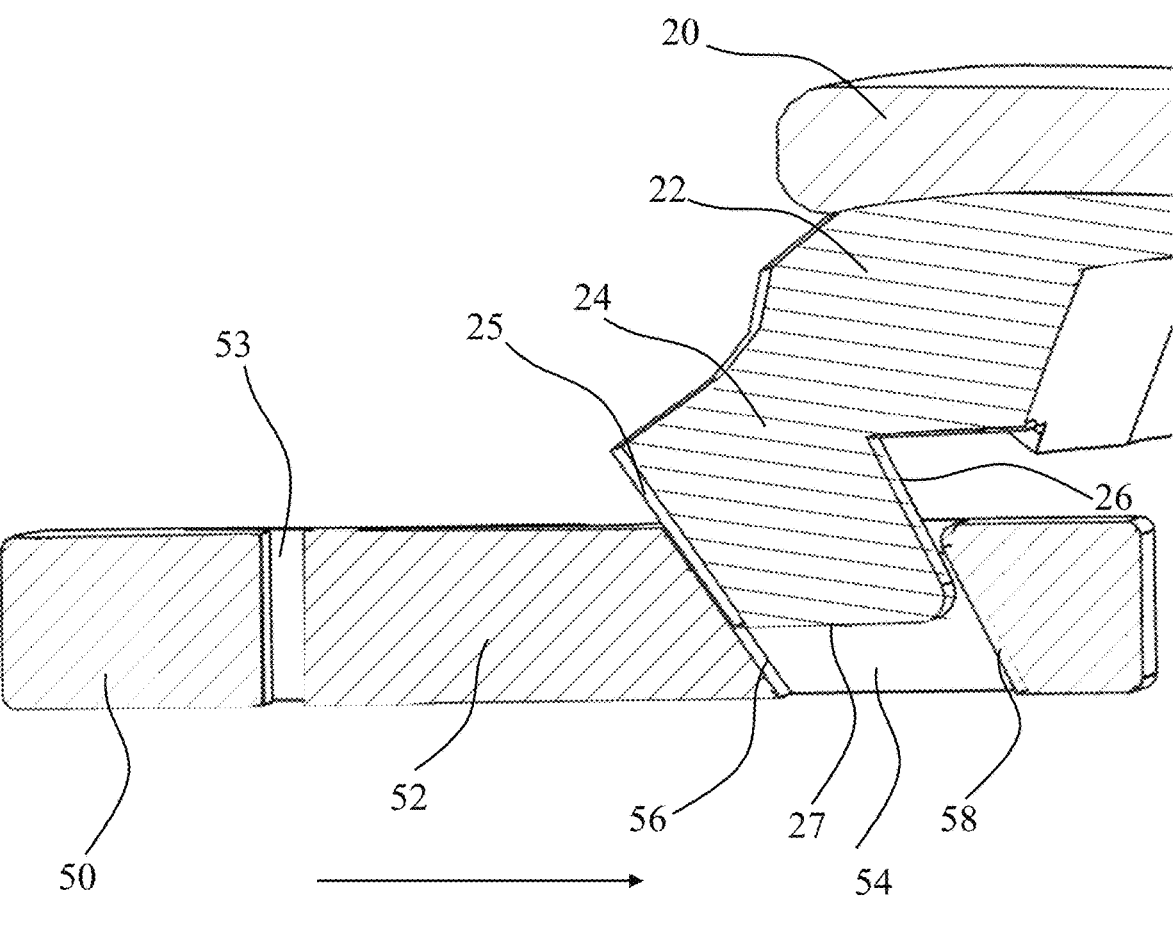
FIG. 13 is the cross section view of FIG. 10 in an alternate configuration.

The locking and unlocking of lens assembly 20 via the interaction between lens protrusion 24 and latch 50 is discussed with respect to FIGS. 12 and 13. Attaching lens assembly 20 to goggle frame 40 begins with latch 50 secured in its second, inward position, with latch arms 55 received by second detent groove 47. This position corresponds to the position of latch 50 shown in FIG. 10. As lens body 21 is brought into contact with goggle frame 40, lens protrusion 24 enters latch 50. Lens actuation surface 25 contacts latch body actuation surface 56, and due to the inclined nature of these surfaces, exerts a force directed towards exterior portion 51 of latch body 52 (i.e., latch 50 is pushed away from lens assembly 20). This external force pushes latch 50 from its second position (FIG. 10) into its first position (FIG. 8), with latch arms 55 received by first detent groove 46. This force is created in part by the magnetic attraction between frame magnets 42 and lens magnets 23 as lens body 21 is seated in lens opening 41.

The fully seated configuration of lens protrusion 24 and latch 50 is shown in FIG. 12. In this position, latch retention surface 58 is in contact with lens retention surface 26. These two surfaces are inclined such that an outward force (in the vertically upwards direction of FIG. 12) applied to lens body 21 drives latch 50 further inwards (to the right in FIG. 12) because of how latch retention surface 58 pushes on lens retention surface 26 when lens protrusion 24 is pulled upwards. However, because of the way latch arms 55 extend both outwards and away from the external end of latch body 52, pulling latch 50 inwards drives latch arms 55 further into first detent groove 46, which prevents latch 50 from moving out of its fully seated configuration in first detent groove 46. The configuration of opening 53 also minimizes any inwards flexing of arms 55 because force applied outwards (towards exterior portion 51) does not cause arms 55 to move inwards because of how opening 53 is shaped. This prevents lens protrusion 24 from releasing from latch body opening 54 because of the interaction between latch retention surface 58 and lens retention surface 26. Thus, lens body 21 is securely retained in goggle frame 40.

Ejecting lens body 21 from goggle frame 40 begins with the user applying an inwards force to exterior portion 51 of latch body 52. As explained above, the force on exterior portion 51 causes arms 55 to retract inwards (FIG. 9). This enables latch body 52 to slide inwards, in the direction of the arrow in FIG. 13. In this situation, latch body actuation surface 56 pushes on lens actuation surface 25, which results in an upwards force on lens protrusion 24 (and, therefore, lens assembly 20) because of the relation between the angle of these surfaces and the direction of the inwards movement of latch 50. FIG. 13 shows lens protrusion 24 approximately halfway through the ejection process. The end result of this movement is that latch 50 is returned to its second, inwards position (FIG. 10), and lens assembly 20 is pushed a short distance from goggle frame 40. This enables the user to grab the perimeter of lens assembly 20 easily without having to touch the central portion of lens body 21, which is desirable because it reduces marring or dirtying of lens body 21.

There can be any number of latches 50 disposed in corresponding latch openings 44. Each latch 50 present requires a corresponding lens protrusion 24 positioned to interact with latch 50. For example, in the embodiment of FIGS. 3 and 5, there are two latches 50, one at each lateral end of goggle frame 40. However, there could be a single latch 50. In an embodiment, this single latch could be positioned on a top portion of the goggle frame. In other aspects, goggle frame 40 can include three, four, five, or more latches 50. All of the latches 50 will be oriented such that the user presses inwards (i.e., towards lens assembly 50) to actuate latch 50. In some embodiments, it may be desirable to arrange latches 50 symmetrically around goggle frame 40 to ensure that the retention of lens assembly 20 is applied evenly.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The foregoing description of the specific embodiments will so fully reveal the general nature of the invention(s) that others can, by applying knowledge within the skill of the art, readily modify or adapt for various applications such specific embodiment, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. An eyewear, comprising:
   a lens assembly comprising a lens protrusion and a lens magnet; and
   a frame, comprising:
      a frame magnet disposed on the frame in a position corresponding to a position of the lens magnet and configured to magnetically attract the lens magnet;
      a latch slidably disposed in the frame configured to releasably receive the lens protrusion in an opening in the latch, the opening in the latch comprising a latch actuation surface that is configured to engage with a lens actuation surface disposed on the lens protrusion, the latch actuation surface and the lens actuation surface configured to apply an ejecting force on the lens assembly that ejects the lens protrusion from the opening in the latch when the latch is moved towards the lens assembly; and
      a first detent groove and a second detent groove disposed in the frame and configured to receive a portion of the latch to secure the latch in a first position and a second position, respectively.

2. The eyewear of claim 1, wherein the latch comprises a latch body and an arm disposed on the latch body, the arm positioned to be received by the first and second detent grooves to secure the latch in the first position and the second position, respectively, wherein the first and second positions correspond to a secured and unsecured lens assembly position, respectively.

3. The eyewear of claim 2, wherein the arm extends outwards from the latch body towards the opening in the latch.

4. The eyewear of claim 2, the latch body further comprising an opening to allow the latch body to flex.

5. The eyewear of claim 4, wherein the arm is configured to move between an engaged position that is configured to engage one of the first and second detent grooves and a disengaged position that is configured to allow the arm to remain separated from the first and second detent grooves when the latch body is flexed towards the opening in the latch.

6. The eyewear of claim 1, the opening in the latch further comprising a latch retention surface;
   the lens protrusion further comprising a lens retention surface corresponding to the latch retention surface, the lens retention surface configured to apply a force on the latch directed away from the lens assembly when the lens assembly is moved outwards after the lens protrusion is received in the opening in the latch.

7. The eyewear of claim 6, wherein the latch retention surface and the lens retention surface are inclined planar surfaces that are angled with respect to a vertical plane parallel to a direction between a top of a nose region of the frame and a center of a brow region of the frame and extending forwards and rearwards from the lens assembly.

8. The eyewear of claim 7, wherein the latch actuation surface and the lens actuation surface are inclined planar surfaces that are angled with respect to a vertical plane parallel to a direction between a top of a nose region of the frame and a center of a brow region of the frame and extending forwards and rearwards from the lens assembly, and
   wherein the latch actuation surface and the lens actuation surface are not parallel to the latch retention surface or the lens retention surface, respectively.

9. The eyewear of claim 1, the lens assembly further comprising a second lens protrusion; and
   the eyewear further comprising a second latch disposed in the frame, the second latch configured to receive the second lens protrusion in a second opening in the second latch.

10. The eyewear of claim 1, wherein the lens assembly comprises a lens frame, and wherein the lens protrusion is an integral and monolithic part of the lens frame.

11. An eyewear, comprising:
    a frame, comprising;
       a frame magnet disposed on the frame in a position corresponding to a position of a lens magnet and configured to magnetically attract the lens magnet;
       a latch opening disposed in the frame; and
       a latch slidably disposed in the latch opening configured to releasably receive a lens protrusion in an opening in the latch, the opening in the latch comprising a latch actuation surface that is configured to engage with a lens actuation surface of the lens protrusion, the latch actuation surface and the lens actuation surface configured to apply an ejecting force on a lens that ejects the lens protrusion from the opening in the latch when the latch is moved towards the lens.

12. The eyewear of claim 11, wherein the lens comprises a lens body, and a lens frame coupled to the lens body, the lens magnet disposed on the lens frame, wherein the lens protrusion is coupled to the lens frame.

13. The eyewear of claim 12, further comprising a second lens protrusion disposed on the lens frame; and
    a second latch disposed in a second latch opening in the frame, the second latch configured to receive the second lens protrusion in a second opening in the second latch.

14. The eyewear of claim 12, wherein the lens frame is an integral and monolithic part of the lens body.

15. The eyewear of claim 14, wherein the lens protrusion is an integral and monolithic part of the lens frame.

16. The eyewear of claim 11, wherein the frame includes a first detent groove and a second detent groove in the latch opening that are configured to receive a portion of the latch to secure the latch in a first position and a second position, respectively, wherein the first and second positions correspond to a secured and unsecured lens position of the lens, respectively.

17. The eyewear of claim 16, wherein the latch comprises a latch body and an arm disposed on the latch body, the arm positioned to be received by the first and second detent grooves to secure the latch in the first position and the second position, respectively.

18. The eyewear of claim 17, wherein the latch body includes an opening that is configured to allow the latch body to flex.

19. The eyewear of claim 18, wherein the arm is configured to move between an engaged position that is configured to engage one of the first and second detent grooves and a disengaged position that is configured to allow the arm to remain separated from the first and second detent grooves when the latch body is flexed towards the opening in the latch.

20. The eyewear of claim 11, the opening in the latch further comprising a latch retention surface; and the lens protrusion further comprising a lens retention surface corresponding to the latch retention surface, the lens retention surface configured to apply a force on the latch directed away from the lens when the lens is moved outwards after the lens protrusion is received in the opening in the latch.

21. The eyewear of claim 20, wherein the latch retention surface and the lens retention surface are inclined planar surfaces that are angled with respect to a vertical plane parallel to a direction between a top of a nose region of the frame and a center of a brow region of the frame and extending forwards and rearwards from a lens body of the lens.

22. An eyewear, comprising:

a frame, comprising:

a frame magnet disposed on the frame in a position corresponding to a position of a lens magnet and configured to magnetically attract the lens magnet;

a latch opening;

a latch slidably disposed in the latch opening configured to releasably receive a lens protrusion in an opening in the latch, the opening in the latch comprising a latch actuation surface that is configured to engage with a lens actuation surface disposed on the lens protrusion, the latch actuation surface and the lens actuation surface configured to apply an ejecting force on a lens assembly that ejects the lens protrusion from the opening in the latch when the latch is moved towards the lens assembly; and a first detent groove and a second detent groove disposed in the latch opening and configured to receive a portion of the latch to secure the latch in a first position and a second position, respectively, wherein the first and second positions correspond to a secured and unsecured lens position, respectively.

23. The eyewear of claim 22, further comprising:

the lens assembly, comprising:

a lens body; and a lens frame disposed on an inner surface of the lens body and having the lens protrusion, the lens magnet disposed on the lens frame.

24. The eyewear of claim 23, wherein the lens frame is an integral and monolithic part of the lens body.

25. The eyewear of claim 24, wherein the lens protrusion is an integral and monolithic part of the lens frame.

26. The eyewear of claim 22, wherein the latch comprises a latch body and an arm disposed on the latch body, the arm positioned to be received by the first and second detent grooves to secure the latch in the first position and the second position, respectively.

27. The eyewear of claim 26, wherein the arm extends outwards from the latch body and inwards towards the opening in the latch.

28. The eyewear of claim 27, wherein the arm is configured to move between an engaged position that is configured to engage one of the first and second detent grooves and a disengaged position that is configured to allow the arm to remain separated from the first and second detent grooves when the latch body is flexed towards the opening in the latch.

29. The eyewear of claim 26, the latch body further comprising an opening to allow the latch body to flex.

\* \* \* \* \*